(12) United States Patent
Stevens

(10) Patent No.: US 7,404,571 B2
(45) Date of Patent: Jul. 29, 2008

(54) LINEAR INFLATOR AND MOUNTING CLIP

(75) Inventor: Bruce A. Stevens, Oakland, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 56 days.

(21) Appl. No.: 11/067,027

(22) Filed: Feb. 25, 2005

(65) Prior Publication Data

US 2005/0189740 A1   Sep. 1, 2005

Related U.S. Application Data

(60) Provisional application No. 60/547,973, filed on Feb. 26, 2004.

(51) Int. Cl.
*B60R 21/16* (2006.01)

(52) U.S. Cl. ................................ 280/728.2; 280/730.2

(58) Field of Classification Search ............. 280/728.2, 280/730.2, 741
See application file for complete search history.

(56) References Cited

U.S. PATENT DOCUMENTS

| | | | | |
|---|---|---|---|---|
| 4,950,458 A * | 8/1990 | Cunningham | ............... | 422/164 |
| 5,564,743 A * | 10/1996 | Marchant | .................... | 280/741 |
| 5,845,935 A * | 12/1998 | Enders et al. | ............ | 280/743.2 |
| 6,152,484 A * | 11/2000 | Fischer et al. | ............... | 280/736 |
| 6,224,089 B1 * | 5/2001 | Uchiyama et al. | ........ | 280/728.2 |
| 6,305,707 B1 * | 10/2001 | Ishiyama et al. | ......... | 280/728.2 |
| 6,336,651 B1 * | 1/2002 | Mramor et al. | .......... | 280/728.2 |
| 6,375,214 B1 * | 4/2002 | Nishikaji | .................. | 280/728.2 |
| 6,457,741 B2 * | 10/2002 | Seki et al. | ................ | 280/730.2 |
| 6,471,240 B2 * | 10/2002 | Bakhsh et al. | ............... | 280/729 |
| RE38,125 E * | 5/2003 | Shibata et al. | ............ | 280/730.2 |
| 6,578,866 B2 * | 6/2003 | Higashi | .................... | 280/728.2 |
| 6,588,793 B2 * | 7/2003 | Rose | ........................ | 280/728.2 |
| 6,695,340 B2 * | 2/2004 | Gromodka et al. | ........ | 280/730.1 |
| 6,837,513 B2 * | 1/2005 | Oka et al. | ................. | 280/728.2 |
| 6,948,736 B2 * | 9/2005 | DePottey et al. | ......... | 280/728.2 |
| 6,976,700 B2 * | 12/2005 | McCann et al. | .......... | 280/728.2 |
| 2002/0130495 A1 * | 9/2002 | Lotspih et al. | ........... | 280/730.2 |
| 2003/0094798 A1 * | 5/2003 | Ogata et al. | .............. | 280/730.2 |
| 2005/0062262 A1 * | 3/2005 | Williams | .................. | 280/728.2 |
| 2005/0173902 A1 * | 8/2005 | Boxey | ..................... | 280/730.2 |

* cited by examiner

*Primary Examiner*—Faye M. Fleming
(74) *Attorney, Agent, or Firm*—L.C. Begin & Associates, PLLC

(57) ABSTRACT

An inflator (10) for use in an inflatable vehicle occupant protection system. In one aspect, the inflator (10) includes a longitudinal enclosure (22) having a substantially uniform cross-sectional area along at least a portion of the enclosure, and a gas generant composition (24) positioned along the portion of the enclosure (22). The gas generant composition (24) is distributed substantially uniformly along the portion of the enclosure (22). A plurality of gas exit apertures (40) is formed along the portion of the enclosure (22) to enable fluid communication between the enclosure (22) and an exterior of the enclosure. The apertures (40) are spaced apart a distance proportional to a desired rate of propagation of a combustion reaction of gas generant positioned between the apertures (40). In another aspect of the invention, the total number of apertures (40) along the enclosure (22) is inversely proportional to a desired rate of propagation of a combustion reaction of gas generant positioned between the apertures (40). An airbag system (100) incorporating the inflator (10) and methods of attaching the airbag system to a vehicle are also disclosed.

16 Claims, 5 Drawing Sheets

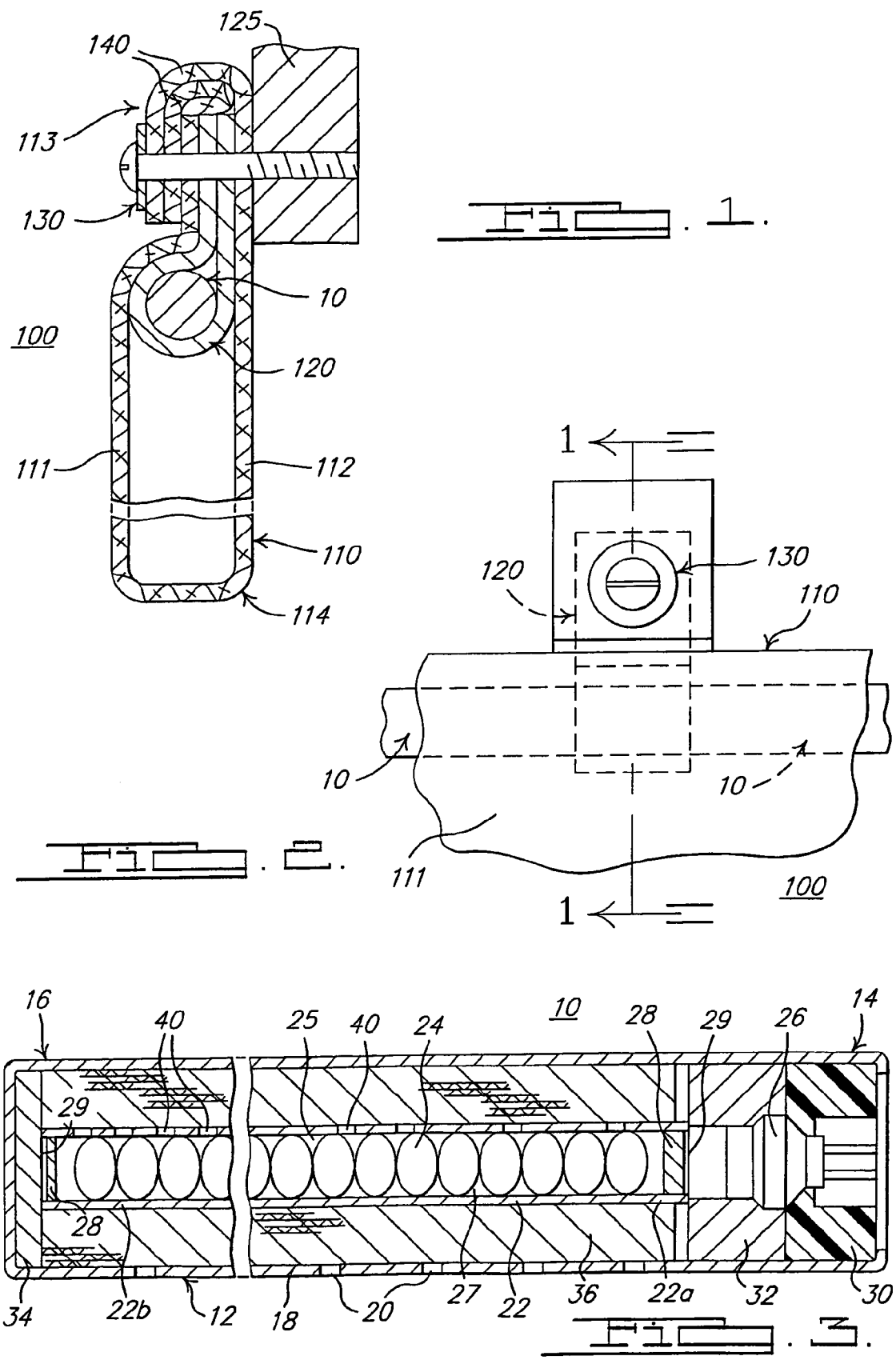

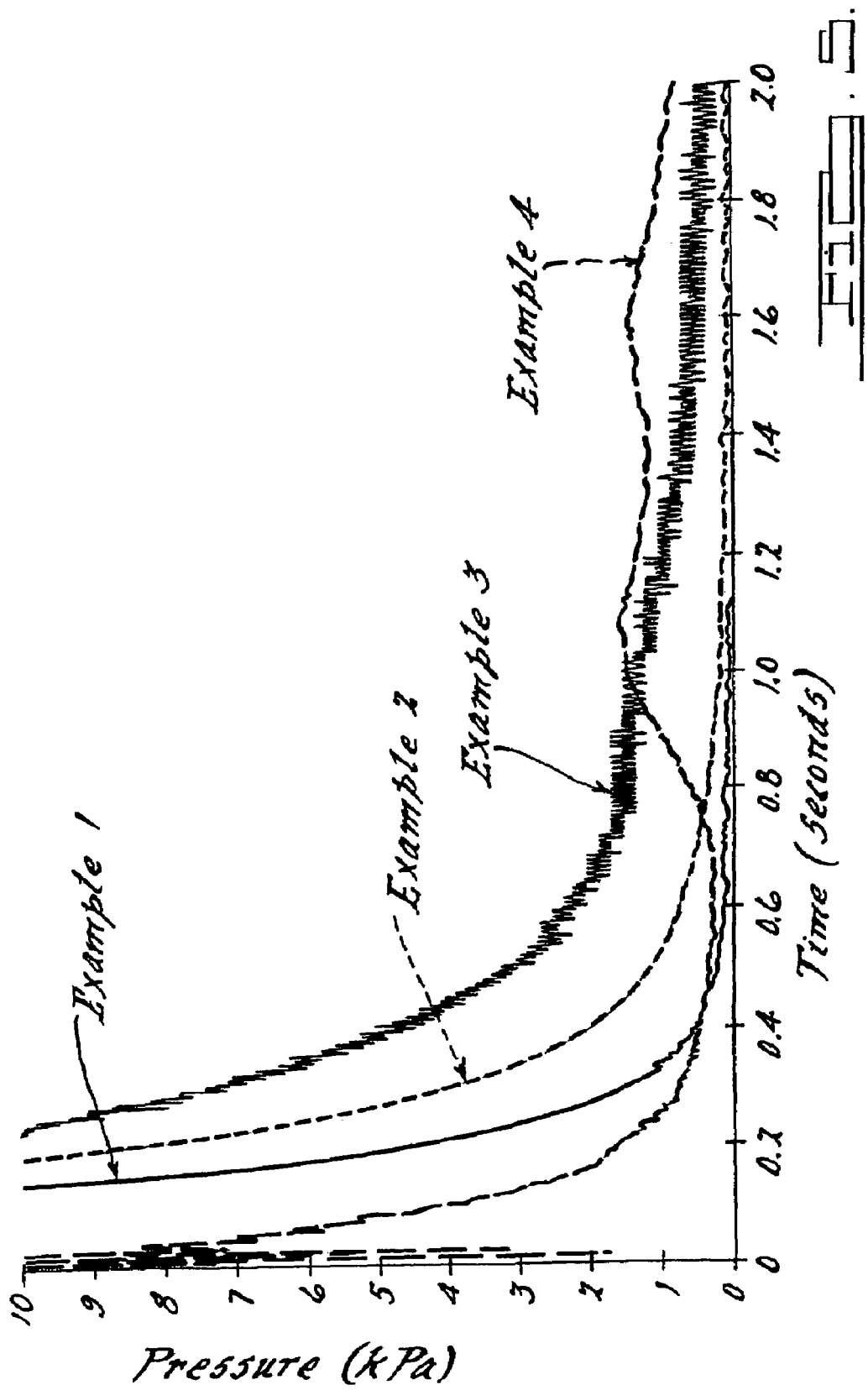

US 7,404,571 B2

LINEAR INFLATOR AND MOUNTING CLIP

CROSS REFERENCE TO RELATED APPLICATIONS

This application claims the benefit of provisional application Ser. No. 60/547,973 filed on Feb. 26, 2004.

BACKGROUND OF THE INVENTION

The present invention relates to inflators for vehicle airbags and, more particularly, to a linear inflator which discharges inflation gas along the length of the inflator for use in side impact or head curtain airbag systems.

In inflation systems for deploying an air bag in a motor vehicle, it is desirable to be able to modify an inflation profile produced by a given inflator design without substantial modifications to the design, in order to accommodate different desired airbag inflation profiles. One method of varying the inflation profile is to modify the composition, amount, and/or physical arrangement of gas generant in the inflator. However, this method of varying the inflation profile may entail relatively complex changes to the inflator design and components, and may also add to inflator manufacturing cost and complexity. It is also desirable to provide a simple, yet reliable method for securing the airbag and the inflator to a portion of the vehicle.

SUMMARY OF THE INVENTION

An inflator construction is provided for use in an inflatable vehicle occupant protection system. In one aspect of the invention, the inflator includes a longitudinal enclosure having a substantially uniform cross-sectional area along at least a portion of the enclosure, and a gas generant composition positioned along at least a portion of the enclosure. The gas generant composition is distributed substantially uniformly along the at least a portion of the enclosure. A first plurality of gas exit apertures is formed along the at least a portion of the enclosure to enable fluid communication between the enclosure and an exterior of the enclosure. The apertures of the first plurality of gas exit apertures are spaced apart a distance proportional to a desired rate of propagation of a combustion reaction of gas generant positioned between the apertures.

In another aspect of the invention, the inflator includes a longitudinal enclosure having a substantially uniform cross-sectional area along at least a portion of the enclosure, and a gas generant composition positioned along the at least a portion of the enclosure. The gas generant composition is distributed substantially uniformly along the at least a portion of the enclosure. A first plurality of gas exit apertures is formed along the at least a portion of the enclosure to enable fluid communication between the enclosure and an exterior of the enclosure. The number of apertures in the first plurality of gas exit apertures is inversely proportional to a desired rate of propagation of a combustion reaction of gas generant positioned between the apertures.

In yet another aspect of the invention, an airbag system is provided comprising an airbag and at least one mounting clip coupled to the airbag for mounting the airbag to a vehicle. The mounting clip defines a cavity configured for receiving a portion of the inflator therein. The airbag system further comprises an inflator received in the mounting clip cavity and secured to the vehicle using the mounting clip. The inflator is coupled to the airbag so as to enable fluid communication between the inflator and an interior of the airbag.

BRIEF DESCRIPTION OF THE DRAWINGS

In the drawings illustrating embodiments of the present invention:

FIG. 1 is a cross-sectional side view of a first embodiment of an airbag system in accordance with the present invention;

FIG. 2 is a partial frontal view of the airbag system shown in FIG. 1;

FIG. 3 is a cross-sectional side view showing the general structure of an inflator in accordance with the present invention;

FIG. 4 and FIG. 5 are graphical representations of respective airbag inflation pressures provided by activation of various embodiments of the present invention;

DETAILED DESCRIPTION

Figure 4:
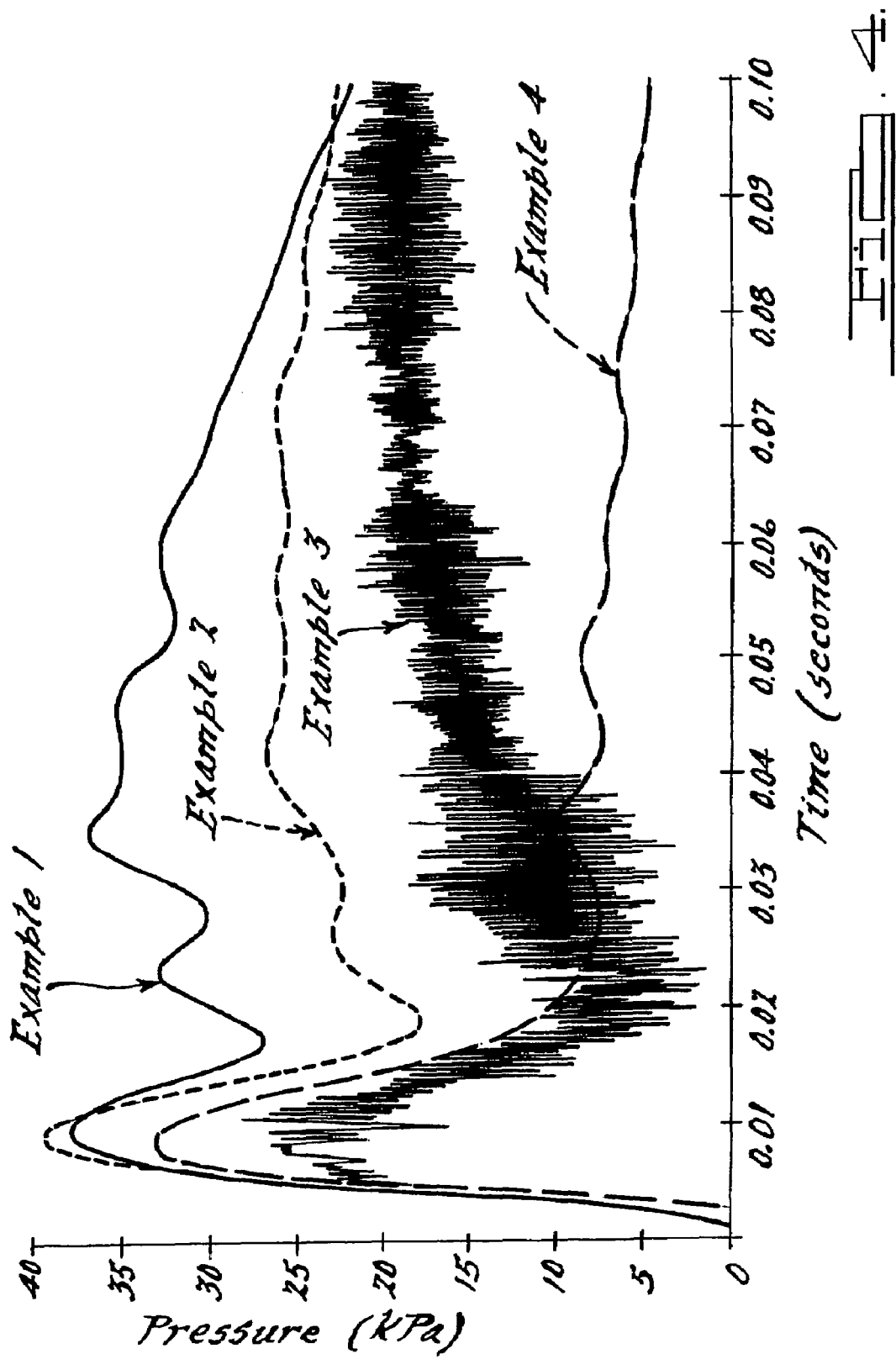

FIGS. 1 and 2 show a first embodiment of an airbag system 100 in accordance with the present invention. Referring to FIGS. 1 and 2, airbag system 100 includes an airbag 110 and one or more mounting clips, generally designated 120, coupled to airbag 110 for mounting the airbag to a vehicle 125. A longitudinal inflator 10 is received in cavities formed in mounting clips 120. It is understood that a plurality of mounting clips 120 as shown in FIGS. 1 and 2 may be spaced along airbag 110 for securing the airbag to the vehicle. Inflator 10 is coupled to airbag 110 so as to enable fluid communication between the inflator and an interior of the airbag. Clips 120 hold inflator 10 and secure both airbag 110 and inflator 10 to the body of the vehicle 125.

FIG. 3 shows a cross-sectional view of an inflator 10 suitable for use in the airbag assembly shown in FIGS. 1 and 2. Inflator 10 is preferably constructed of components made from a durable metal such as carbon steel or iron, but may also include components made from tough and impact-resistant polymers, for example. One of ordinary skill in the art will appreciate various methods of construction for the various components of the inflator. U.S. Pat. Nos. 5,035,757, 6,062, 143, 6,347,566, U.S. Patent Application Serial No. 2001/0045735, WO 01/08936, and WO 01/08937 exemplify typical designs for the various inflator components, and are incorporated herein by reference in their entirety, but not by way of limitation.

Referring to FIG. 3, inflator 10 includes a tubular housing 12 having a pair of opposed ends 14, 16 and a housing wall 18. Housing 12 may be cast, stamped, extruded, or otherwise metal-formed. A plurality of gas exit apertures 20 are formed along housing wall 18 to permit fluid communication between an interior of the housing and an airbag (not shown).

A longitudinal propellant tube or gas generant enclosure 22 is inwardly radially spaced from housing 12 and is coaxially oriented along a longitudinal axis of the housing. Enclosure 22 has an elongate, substantially cylindrical body defining a first end 22a, a second end 22b, and an interior cavity for containing a gas generant composition 24 therein. Enclosure first end 22a is positioned to enable fluid communication between an igniter 26 and the enclosure interior cavity. Enclosure 22 is configured to facilitate propagation of a combustion reaction of gas generant 24 along the enclosure, in a manner described in greater detail below.

A plurality of gas generant tablets 24 are stacked side by side along the length of enclosure 22. Each tablet 24 has substantially the same dimensions. In one embodiment, each gas generant tablet 24 has an outer diameter of ¼" and a pair of opposing, generally dome-shaped faces 27, providing a maximum tablet width of approximately 0.165" between faces. As seen in FIG. 3, tablets 24 are shaped or configured to advantageously create a cavity 25 between adjacent tablets 24. These cavities 25, in sum, provide a volume of air space within enclosure 22, thereby enhancing the burn characteristics of tablets 24 when they are ignited. An alternative arrangement of the gas generant along the length of the enclosure may be provided. However, any arrangement of gas generant along the enclosure preferably provides a substantially uniform average distribution of gas generant along the length of the enclosure. Examples of gas generant compositions suitable for use in the present invention are disclosed in U.S. Pat. Nos. 5,035,757, 6,210,505, and 5,872,329, incorporated herein by reference. However, the range of suitable gas generants is not limited to that described in the cited patents.

A quantity of a known auto-ignition composition 28 is positioned at either end of the stack of gas generant material 24. Enclosure 22 is environmentally sealed at both ends with an aluminum tape 29 or any other effective seal.

An igniter 26 is secured to inflator 10 such that the igniter is in communication with the interior of gas generant enclosure 22, for activating the inflator upon occurrence of a crash event. In the embodiment shown in FIG. 3, igniter 26 is positioned within an annular bore of an igniter closure 30. Igniter 26 may be formed as known in the art. One exemplary igniter construction is described in U.S. Pat. No. 6,009,809, herein incorporated by reference.

Igniter closure 30 is crimped or otherwise fixed to a first end 14 of housing 12. A first endcap 32 is coaxially juxtaposed adjacent igniter closure 30 to form, in conjunction with igniter closure 30, an inner housing for igniter 26. First endcap 32 also provides a closure for gas generant enclosure 22. A second endcap 34 is crimped or otherwise fixed to a second end 16 of housing 12. Endcaps 32 and 34 and igniter closure 30 may be cast, stamped, extruded, or otherwise metal-formed. Alternatively, endcaps 32 and 34 may be molded from a suitable polymer.

A filter 36 may be incorporated into the inflator design for filtering particulates from gases generated by combustion of gas generant 24. In general, filter 36 is positioned between gas generant 24 and apertures 20 formed along inflator housing wall 18. In the embodiment shown in FIG. 3, filter 36 is positioned exterior of gas generant enclosure 22 intermediate enclosure 22 and housing wall 18, and substantially occupies the annular space between gas generant enclosure 22 and housing wall 18. In an alternative embodiment (not shown), filter 36 is positioned in the interior cavity of enclosure 22 between gas generant 14 and enclosure gas exit apertures 40 formed along enclosure 22. The filter may be formed from one of a variety of materials (for example, a carbon fiber mesh or sheet) known in the art for filtering gas generant combustion products.

In accordance with the present invention, a plurality of gas exit apertures 40 is particularly formed along enclosure 22 to tailor the rate of propagation of a combustion reaction of the gas generant 24 along the enclosure, as required by design criteria. Apertures 40 are spaced apart along enclosure 22 as described in greater detail below. Enclosure 22 may be roll formed from sheet metal and then perforated to produce apertures 40. Enclosure apertures 40 are environmentally sealed with an aluminum tape 42 or any other effective seal.

The effects of the sizes of enclosure apertures 40 and the spacing between the apertures on combustion propagation were studied by constructing a number of inflators substantially as shown in FIG. 3. Multiple groups of apertures 40 were formed along each enclosure 22, with the sizes and spacing of the apertures varying in a predetermined manner within each group as described below, beginning at the end of inflator 10 proximate igniter 26.

EXAMPLE 1

A first group of 23 apertures having a 4.0 mm diameter and spaced one inch on center (OC) was first linearly formed, and then a second group of 48 apertures having a 4.0 mm diameter and spaced ½" OC were formed collinear with the first group of apertures.

EXAMPLE 2

A first group of 16 apertures having a 4.0 mm diameter and spaced one inch on center (OC) were first linearly formed; next a second group of 51 apertures having a 4.0 mm diameter and spaced ½" OC were formed collinear with the first group of apertures; and finally a third group of 20 apertures having a 5.0 mm diameter and spaced ¼" OC were formed collinear with the first and second groups of apertures.

EXAMPLE 3

A first group of 12 apertures having a 4.0 mm diameter and spaced one inch on center (OC) were first linearly formed; next a second group of 47 apertures having a 4.0 mm diameter and spaced ½" OC were formed collinear with the first group of apertures; and finally a third group of 45 apertures having a 5.0 mm diameter and spaced ¼" OC were formed collinear with the first and second groups of apertures.

EXAMPLE 4

A first group of 12 apertures having a 4.0 mm diameter and spaced one inch on center (OC) were first linearly formed; next a second group of 23 apertures having a 4.0 mm diameter and spaced ½" OC were formed collinear with the first group of apertures; and finally a third group of 91 apertures having a 5.0 mm diameter and spaced ¼" OC were formed collinear with the first and second groups of apertures.

The term "on center" is defined to be from the center point of one orifice to the center point of an adjacent orifice. The size of the holes or gas exit apertures preferably ranges from about one millimeter to about one-half the diameter of enclosure 22. Holes smaller than one millimeter are often difficult to manufacture with consistent size and with the desired efficiency. Holes or gas exit apertures larger than half the diameter of the enclosure weaken the structure of the tube and are therefore relatively difficult to produce.

The gas exit apertures are preferably spaced about six millimeters to twenty-six millimeters on center. A spacing less than about six mm on center may weaken the structure of enclosure 22, and presents a further structural concern if the local or associated gas exit aperture size is relatively large or close to the diameter of the gas generant enclosure. On center spacing larger than twenty-six mm may be employed although the efficiency of the cooling screen may consequently be reduced.

As such, the present invention incorporates a tailored overall surface area dependent on both the size and spacing of the gas exit apertures. The overall surface area may be tailored based on various design criteria such as the composition of the gas generant and/or the desired inflation profile of an associated airbag, for example. The distribution of the overall surface area from a relatively lower aperture area within the first half of the propellant tube (that is the half closest or adjacent to the ignition source) to a relatively larger aperture area within the second half of the propellant tube (that is the half of the propellant tube farthest from the ignition source) provides the desired combustion propagation across the length of the tube.

The percentage of the total surface area as a function of the position of the holes from the ignition source is tabulated and exemplified below. The open area is defined as the sum of the areas of all the gas exit apertures spaced along enclosure 22. Starting with a known example of equally spaced holes of equal size, the orifice area is equally distributed throughout the length of the propellant tube. This results in the fastest propagation time and the shortest burnout time, or, the time required to completely combust the gas generant. As shown in Examples 1 through 4, the share of the aperture/orifice area at the ignition end of the tube is relatively smaller while the share of the orifice area at the opposite end of the ignition tube is relatively larger. This causes a proportional increase in the time it takes for the entire propellant stack to ignite and therefore affects the initial combustion rate and the duration of gas generation.

Each of the inflators was then activated, and the resulting airbag inflation pressure measured over the first few seconds of inflation. FIG. 4 graphically represents the resulting airbag inflation pressures during the first 0.1 second after inflator activation. FIG. 5 graphically represents the airbag inflation pressures during the first two seconds after inflator activation.

Based on these measurements and on laboratory analysis, it is believed that after initiator 26 is activated, the propagation rate of the combustion reaction along the enclosure is dependent upon the number of apertures 40 and the spacing between the apertures along enclosure 22. More specifically, it is believed that, along the sections of the enclosure where the aperture spacing is 1" OC, the combustion reaction propagates via hot gases because the pressure inside this portion of the enclosure is relatively high due to the relative shortage of apertures to relieve the pressure; thus, there is a driving pressure force urging the hot gases further down the enclosure. In the sections where the aperture spacing is ½" OC, the combustion reaction still propagates via hot gases but at a slower rate because the internal pressure is relatively lower, due to the shorter distance between apertures. In the sections where the aperture spacing is ¼" OC, apertures 40 are relatively numerous, permitting the enclosure internal pressure to be more easily relieved; thus, there is minimal driving pressure force urging the hot gases further down the length of the enclosure. In this case, the combustion reaction continues to propagate at a relatively slower rate as each tablet 24 ignites the next adjacent tablet as it burns.

Thus, from an analysis of the above examples, it is believed that a relatively greater spacing between enclosure apertures 40 produces a correspondingly greater pressure within enclosure 22, resulting in a more rapid propagation (via hot gases) of the combustion reaction along the portion of the gas generant residing between the spaced-apart apertures. The more rapid propagation of the combustion reaction results in a more rapid burning of the gas generant and, thus, a more rapid generation of inflation gas, and more rapid inflation of an associated airbag, for example. Therefore, to affect the propagation rate of a combustion reaction along a portion of the enclosure, the apertures along the portion of the enclosure may be spaced apart a distance proportional to a desired rate of propagation of a combustion reaction of gas generant positioned between the apertures. The examples therefore illustrate how the combustion propagation rate may be tailored using an appropriate arrangement of enclosure apertures, to accommodate greater or lesser desired airbag inflation rates, and also to accommodate desired shorter or longer inflation durations. It should be appreciated that the type of propellant or gas generant composition 24 employed, for example those described in U.S. Pat. Nos. 5,035,757, 5,872,329, and 6,210,505, each herein incorporated by reference, may also be determinative of the desired combustion propagation rate across the length of the propellant tube 22. Accordingly, the propellant employed will affect the aperture open area along the length of the propellant tube. As different propellants are employed, the "aperture open area/unit length of the propellant tube" may be iteratively determined by experimental methods to produce the desired propagation rate across the length of the enclosure or propellant tube. For example, propellant tubes containing the same propellant could be perforated with different open areas per unit length across the length of the propellant tube in accordance with the present invention, and then qualitatively and quantitatively evaluated for sustained combustion, combustion propagation, inflation profile of an associated airbag, gas generating duration, inflator pressure across the length thereof, and other design criteria.

TABLE

Exemplary Open Area Percentages for Respective Sectional Lengths of the Propellant Tube

| | First 25% of Prop. Tube Length (closest to initiator end) | Second 25% of Prop Tube Length (next to second end). | Third 25% of Prop Tube Length (next to third end). | Fourth 25% of Prop. Tube Length (farthest from initiator end). |
|---|---|---|---|---|
| Equally Spaced and Sized Holes | 25% | 25% | 25% | 25% |
| Example 1 | 17% | 18% | 34% | 31% |
| Example 2 | 12% | 19% | 24% | 44% |
| Example 3 | 9% | 19% | 18% | 54% |
| Example 4 | 7% | 13% | 43% | 37% |

Preferred ranges for the percentage of the total aperture areas of each section of the propellant tube are as follows:

First 25% of Propellant Tube Length (Closest to the Initiator)—about 7-25%, and preferably Second 25% of Propellant Tube Length—about 13-25%

Third 25% of Propellant Tube Length—about 18-43%

Fourth 25% of Propellant Tube Length—25-54%

In view of the data given above, the present invention includes a propellant tube 22 having a plurality of gas exit apertures 40 wherein the area of each hole is calculated and a total open aperture area or sum is calculated by adding the gas exit aperture areas together. A first perforated section 23 or portion of the propellant tube 22 is fixed closest to the igniter 26, wherein the first portion 23 includes less than half of the total open aperture area. A second perforated section 25 or portion of the propellant tube 22 is integral to and in coaxial relation with the first portion 23, wherein the second portion 25 includes more than half of the total open aperture area. As exemplified in the table given above, the first portion 23 may include up to 75% of the total length of the propellant tube 22, for example. On the other hand, the second portion 25 may include as little as 25% of the total length of the propellant tube 22, for example. It should be appreciated that in a preferred embodiment, the first half 27 of the tube 22 will contain less than half of the total open aperture area, and the second half 29 of the propellant tube 22 will contain more than half of the total open aperture area. As discussed above, the respective first and second gas exit aperture areas of either the first or second sections may be tailored by the number and size of respective gas exit apertures included in either section.

Accordingly, consistent with the table given above, the present invention may also be characterized as an elongated inflator 10 comprising a plurality of collinear and integral sections that together constitute a single perforated tube 22. As such, in this embodiment, a first section nearest to an associated igniter, a second section juxtaposed to the first section, a third section juxtaposed to the second section, and a fourth section farthest from the igniter and juxtaposed to the third section constitute the propellant tube internal to the inflator. More generally, the present invention includes an elongated inflator 10 that contains an elongated propellant tube 22 substantially coextensive therewith. A first end 31 of the propellant tube 22 is fixed to an associated igniter 26. A second end 33 of the propellant tube 22 is preferably capped to seal off the flow of combustion gases upon inflator 10 activation. A plurality of gas exit orifices 40 is formed within the propellant tube 22 from the first end to the second end. As supported in the table shown above relative to overall open aperture area, the number and/or size of the apertures increases per unit length from the first end to the second end.

It is noted that the stacking of substantially uniform gas generant tablets 24 adjacent each other along enclosure 22 provides for a relatively constant average density of gas generant along the enclosure. Also, the use of an enclosure having a substantially constant cross-sectional area along the length of the enclosure provides for a substantially constant volume per unit length of the enclosure. These features aid in minimizing pressure variations within the enclosure due to such factors as variations in enclosure volume, and localized hot spots and higher pressure regions resulting from disparities in gas generant distribution along the enclosure. The dome-shaped faces of each propellant tablet further facilitates an ease of assembly in that each dome-shaped face provides a pivot point at its apex that physically communicates with the apex of an adjacent tablet's propellant face. Accordingly, by virtue of the pivot point created on each dome-shaped face, the same juxtaposed orientation of each propellant tablet is assured without undue complication.

In addition, it may be seen (particularly from FIG. 4) that the airbag pressure measured in each Example decreases markedly from an initial peak value within approximately 0.02 seconds of inflator activation. It may also be seen that the magnitude of the initial pressure drop is relatively smaller for the inflator of Example 1 and relatively greater for the inflator of Example 4. It is believed that the magnitude of this pressure drop is related to the total number of apertures along the respective gas generant enclosure. The gas generant enclosure of Example 1 has a total of 71 apertures formed therealong, while the enclosure of Example 4 has a total of 126 apertures formed therealong. It is believed that the greater number of apertures along the enclosure of Example 4, spaced along a greater length of the respective enclosure, provides a greater total aperture area for relief of enclosure internal pressure. Thus, the greater number of apertures along the gas generant enclosure of Example 4 may serve to reduce the combustion propagation rate relative to the enclosure of Example 1, because of the relatively larger drop in the enclosure. Therefore, to affect the propagation rate of a combustion reaction along a portion of the enclosure, the number of apertures provided along the portion of the enclosure is made inversely proportional to a desired rate of propagation of a combustion reaction along the gas generant positioned between the apertures.

Figures 6A, 6B:
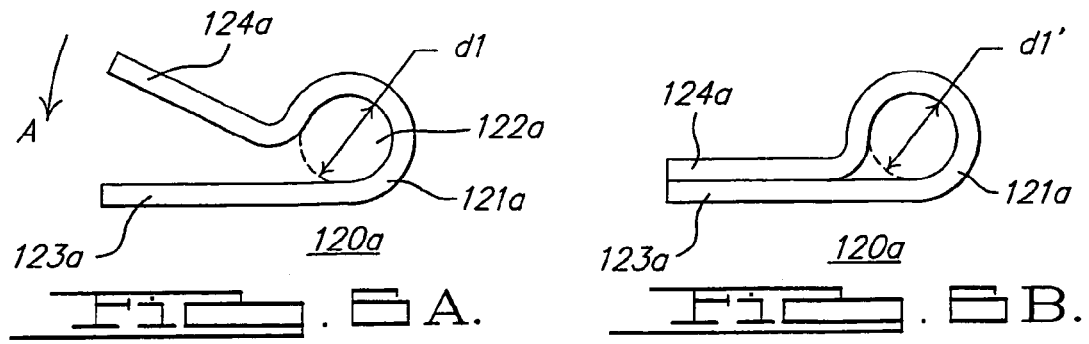
FIGS. 6A and 6B show side views of one embodiment of a mounting clip in accordance with the present invention.

FIGS. 6A, 6B, and 7-10 show various embodiments of mounting clip 120. The embodiment of the mounting clip detailed in FIGS. 6A and 6B is shown in the views of the assembled airbag system (FIGS. 1 and 2) to illustrate the principles of the invention. However, it is appreciated that any of the alternative mounting clip embodiments shown in FIGS. 7-9 may be used in place of the clip shown in FIGS. 6A and 6B.

In the embodiment shown in FIGS. 6A and 6B, each mounting clip 120a includes a body portion 121a defining a cavity 122a for receiving a portion of inflator 10 therein, and a first end portion 123a projecting from the body portion. A second end portion 124a also projects from body portion 121a. In a particular embodiment, clip second end portion 124a extends adjacent first end portion 123a.

Generally, when inflator 10 is received within the clip cavities and/or when the clips are secured to the vehicle, a series of interference fits is formed between the inflator and the clips. Referring to FIGS. 6A and 6B, in a relaxed condition of clip 120a (in which inflator 10 has not yet been positioned in cavity 122a), an inner diameter d1 of the clip is greater than an outer diameter (not shown) of inflator 10, thereby permitting the inflator to be inserted into cavity 122a prior to securement of the clip to the vehicle. If clip second end portion 124a is moved in the direction indicated by arrow "A" to contact first end portion 123a of clip 120a prior to insertion of the inflator into cavity 122a, inner diameter d1 of the clip becomes less than the outer diameter of inflator 10. Consequently, when inflator 10 is received in cavity 122a and clip second end portion 124a is moved in the direction indicated by arrow "A" to contact first end portion 123a, an interference fit is formed between inflator 10 and clip 120a.

Figures 7, 8:
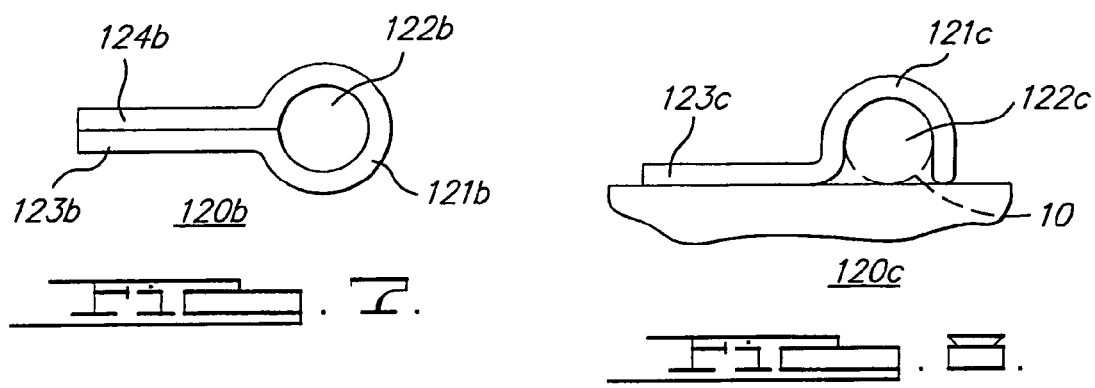
FIGS. 7-9 are side views of alternative embodiments of a mounting clip in accordance with the present invention.

FIG. 7 shows another embodiment 120b of the mounting clip similar to that shown in FIGS. 6A and 6B. In this embodiment, first end portion 123b and second end portion 124b are in contact prior to insertion of the inflator into cavity 122b. First end portion 123b and second end portion 124b are then pulled apart to enable insertion of a portion of inflator 10 into clip cavity 122b.

FIG. 8 shows yet another embodiment 120c of the mounting clip. This embodiment includes a single end portion 123c projecting from body portion 121c. In this embodiment, inflator 10 is secured between clip 120c and vehicle portion 125 when clip 120c is fastened to vehicle portion 125.

Figure 9:
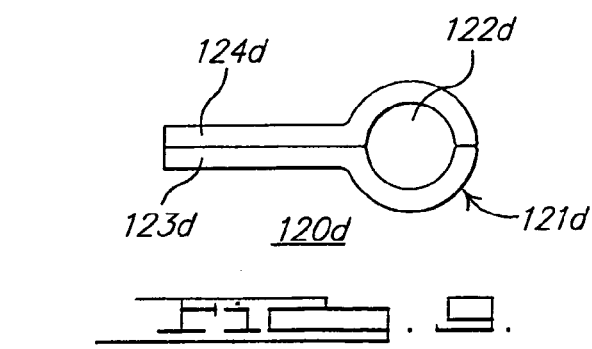

Referring to FIG. 9, in another embodiment of the clip, clip body portion 121d is formed by two separate pieces 125d and 126d, with first end portion 123d extending from a first piece 125d and second end portion 124d extending from a second piece 126d.

Figure 10:
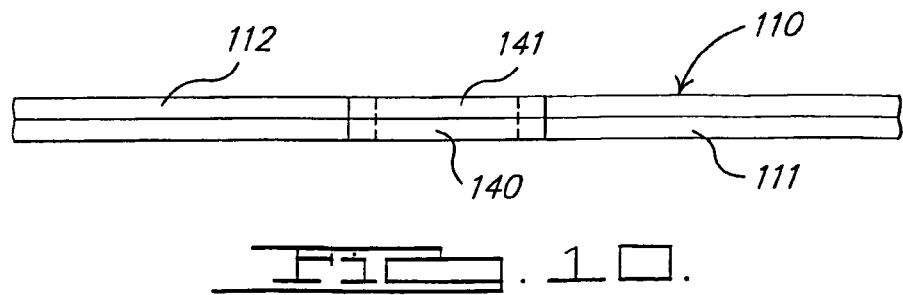
FIG. 10 is a top side view of a portion of an airbag constructed in accordance with the present invention.

Airbag 110 may be formed by methods known in the art. Referring to FIGS. 1, 2, and 10, in a first embodiment, airbag 110 is generally formed from a single sheet of material known for its utility in airbag construction. The sheet is folded in half thereby creating a first panel 111 positioned overlying a second panel 112, with the folded sheet having an upper longitudinal edge 113 and a lower longitudinal edge 114.

Figure 11:
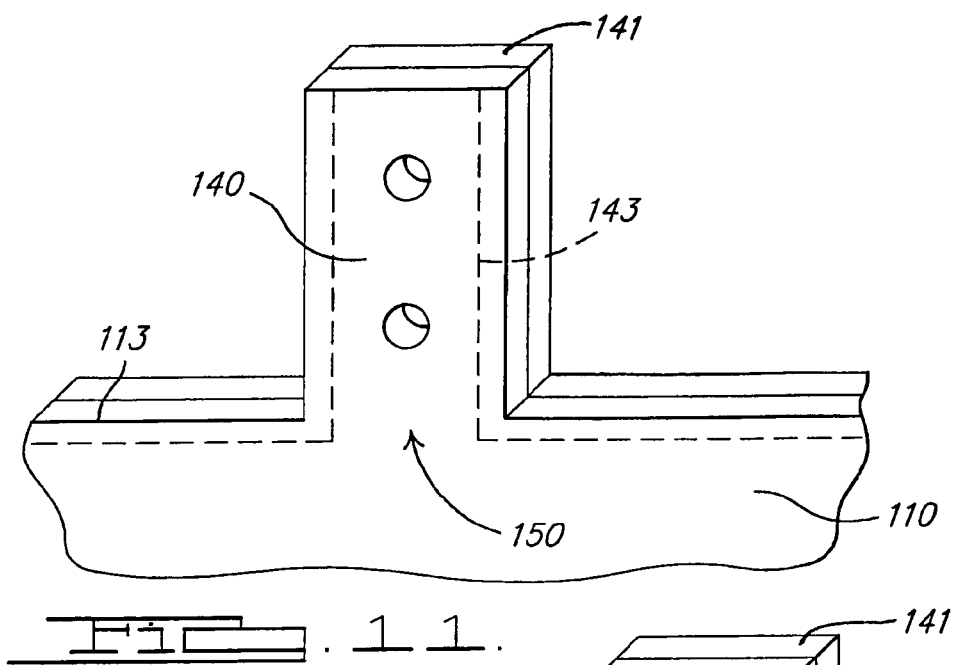
FIG. 11 is a front perspective view of the portion of the airbag shown in FIG. 10.
Figure 12:
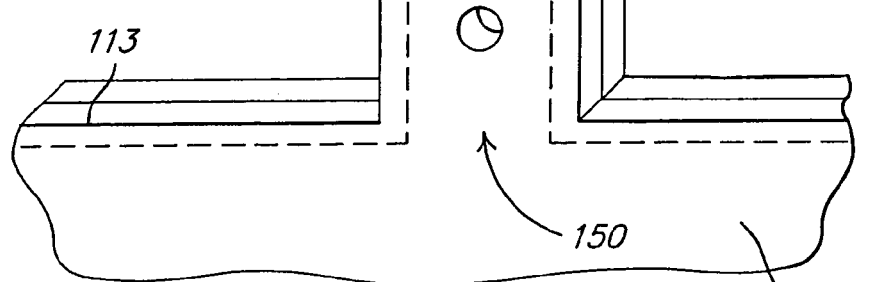
FIG. 12 is an alternative embodiment of the portion of the airbag shown in FIG. 11.

Referring to FIGS. 10-12, in another aspect of the present invention, airbag 110 is formed with at least one and preferably a plurality of fastening tabs 140, 141. Tabs 140, 141 are formed along an upper edge 113 of the side airbag or curtain and are spaced along the length of the airbag. Tabs 140, 141 are formed integrally along the same longitudinal edge 113 and are preferably evenly spaced along the length of the airbag.

Referring to FIGS. 1, 2, and 10-12, a series of pockets 150 is formed in airbag 110 for receiving end portions 123a and 124a of mounting clips 120a therein. In the embodiment shown in FIGS. 1, 2, and 10-12, first tabs 140 extend from edge 113 of the airbag and second tabs 141 extend from edge 113 of the airbag opposite corresponding ones of first tabs 140, and pockets 150 are formed between the first and second tabs. Seams 143 between first tabs 140 and second tabs 141 may be sealed to provide a substantially gas-tight seal along the perimeters of the tabs.

As shown in FIGS. 10-12, when forming airbag 110 by conventional methods, each fastening tab 140, 141 is simply cut from top longitudinal edge 113 and then sewn to create pocket 150 and to seal the airbag. This method of assembly provides a sealed, reinforced area of airbag 110 for attachment to the vehicle, thereby mitigating the likelihood of bag tear upon deployment due to weakened areas of attachment. In this embodiment, pockets 150 are in fluid communication with an interior of the airbag. Thus, clips 120a are positioned in an interior of the airbag, in pockets 150.

Assembly of the airbag module will now be discussed with reference to clips 120a shown in FIGS. 6A and 6B. However, it is appreciated that the airbag may also be assembled using any of the alternative mounting clip embodiments shown in FIGS. 7-9.

Referring again to FIGS. 1, 2, and 10-12, upon assembly of the airbag module, mounting clips 120a are substantially evenly space along the length of inflator 10. The inflator is then installed through a neck portion of airbag 110. Each mounting clip 120a is aligned with and inserted into a corresponding pocket 150 formed between tabs 140, 141. Second end portions 124a of clips 120a are then moved in the direction indicated by arrow "A" (FIG. 6A) to bring second end portion 124a into contact with first end portion 123a. Each tab 140, 141 is formed to be longer than corresponding end portions 123a, 124a of mounting clips 120a extending therein. Accordingly, to fasten airbag 110 to the vehicle trim or airbag module housing, tabs 140, 141 are folded over a corresponding longitudinal edge 113 of the airbag in juxtaposition to adjacent mounting clip end portions 123a, 124a. A mounting screw/washer 130 or other suitable fastener is then driven through tabs 140, 141, mounting clips 120a, and airbag 110, into the trim or airbag module frame. Accordingly, as shown in the Figures, the tabs may be folded over and then fastened into the wall 125, or, the tabs may be sewn as shown in FIG. 12, for example, and simply fastened to wall 125 without folding the tabs 140 and/or 141 over prior to fastening.

As stated previously, when clip end portions 123a and 124a are forced together and mounted to the vehicle, mounting clip inner diameter d1 is effectively smaller than the outer diameter of the inflator housing; thus, inflator 10 is secured within clip cavities 121a. This inflator mounting structure substantially simplifies assembly of the airbag assembly by providing a framework for attaching inflator 10 and airbag 110 to the trim in one step.

An airbag in accordance with the present invention may be constructed from a non-woven spun bonded olefin sheet, an example of which is commercially-available under the proprietary name of Tyvek®. Alternatively, an airbag in accordance with the present invention may be constructed from a cross laminated high-density polyolefin film, an example of which is commercially-available under the proprietary name of Valeron®. In general, the airbag is constructed of a relatively lighter and thinner fabric than from airbag fabrics generally used in the art. As such, the lightweight airbag is more readily folded and the packing density is decreased thereby requiring an overall smaller package size, and thus providing significant assembly and manufacturing advantages.

Valeron® is marketed by Van Leeer Flexibles, Inc. of Houston, Tex. and is made from high density oriented and cross-laminated polyethylene, and is stated as being puncture-resistant, tear-resistant, and chemical resistant. A preferred film is strong, with a smooth surface, balanced tear-resistance, and of uniform thickness. The film maintains its properties in harsh environments and has a temperature operating range from −70° F. to over 200° F. The film is annealed or subjected to a higher temperature (from 35° C. to just below the melting point of the plastic) thereby providing higher strength than unannealed counterparts.

Fabric particularly well-suited for airbag construction is a spun bonded non-woven polyolefin film-fibril of the type disclosed in U.S. Pat. No. 3,169,899, herein incorporated by reference. Such spun bonded sheets preferably have been thermally bonded as disclosed in U.S. Pat. No. 3,532,589, herein incorporated by reference, or have been calendar bonded, as disclosed in PCT Publication No. WO 97/40224 and also herein incorporated by reference, in order to provide desired air barrier, water barrier, moisture vapor transmission, and strength properties. The term "polyolefin" is intended to mean any of a series of largely saturated open chain polymeric hydrocarbons composed only of carbon and hydrogen. Typical polyolefins include, but are not limited to, polyethylene, polypropylene, polymethylpentene, and various combinations of the monomers ethylene, propylene, and methylpentene. Other similarly engineered polymeric films will be apparent to those of ordinary skill in the art. U.S. Pat. Nos. 6,626,312, 6,579,584, 6,286,145, H1,989, 6,488,801, 6,364,341, 6,447,005, 6,641,896, and 6,355,333, all herein incorporated by reference, describe but do not limit exemplary and other suitable polymeric or plastic films that are useful in the present invention.

The porosity or gas permeability of the suitable airbag fabrics may be tailored by methods known in the art. Exemplary U.S. Pat. Nos. H1,989 and 6,488,801 describe methods to tailor the porosity from zero permeability to various greater permeabilities thereby facilitating a venting advantage not heretofore known in the airbag art.

Conventional airbags are constructed of a woven fabric with sewn seams. Gas permeability is controlled by the tightness of the weave or by a silicone or other coating applied to the woven fabric. The non-woven olefin or polyolefin sheets of preferred airbags in accordance with the present invention may be manufactured having a desired permeability or may be manufactured to have no permeability. As such, the manufacture of the airbag may be tailored to accommodate specific porosity for application to different areas in the vehicle. For example, a side airbag or head curtain airbag may be manufactured with no permeability to ensure that during a roll-over event the airbag sustains inflation and protects the occupant for the duration of the roll. On the other hand, for a driver-side or passenger-side airbag, it may be desirable to tailor the permeability or porosity of the fabric to provide a natural venting feature without having to actually create vents in the airbag as now known in the art.

The airbag may be formed in any shape now known or contemplated hereafter. The seams of the airbag are sealed using an EVA type hot melt adhesive, or an acrylic adhesive or tape, or a low density polyethylene heat seal, for example. As such, the labor intensive sewing of the airbag panel(s) is not required thereby again providing a significant manufacturing and performance advantage given the ease of sealing and given the elimination of the possibility of gas leakage through the seam(s). Furthermore, formation of the fastening tabs is simplified given a reduction in the cutting and sewing of each respective tab.

The airbag and mounting design of the present invention are applicable to typical woven fabric/sewn seam airbag designs, as well as other airbag materials (films, composites, etc.) and seaming methods (heat seals, ultrasonic welding, adhesives, etc.). Woven fabric bags may have sealed or unsealed seams. It is believed that an airbag as formed in the proceeding discussion is particularly amenable to the mounting design given above.

Figure 13:
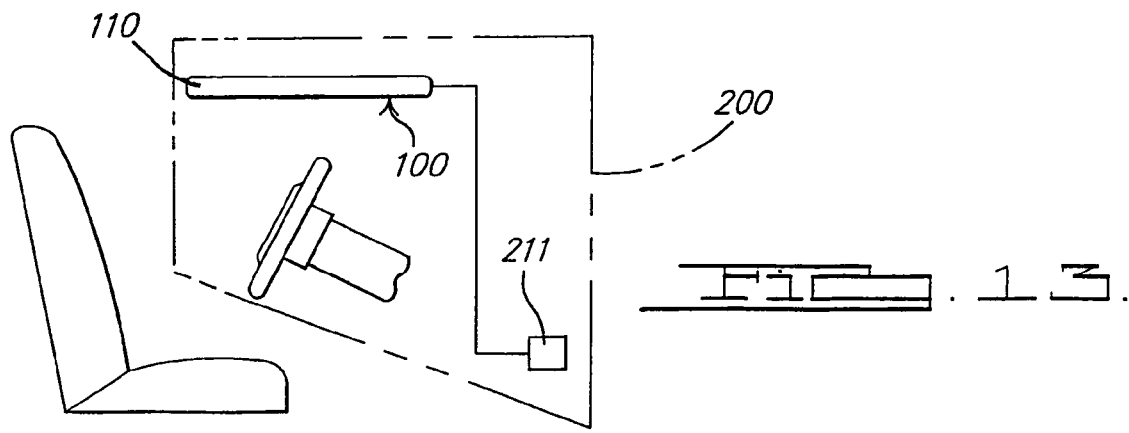
FIG. 13 is a schematic representation of an exemplary vehicle occupant restraint system incorporating an airbag system in accordance with the present invention.

Referring now to FIG. 13, an airbag system 100 constructed in accordance with the principles outlined above may be incorporated into a vehicle occupant restraint system 200. Vehicle occupant restraint system 200 includes an airbag system 100 incorporating at least one airbag 110 constructed in accordance with the present invention, and at least one mounting clip (not shown) coupled to airbag 110 for mounting the airbag to a vehicle, the mounting clip defining a cavity (not shown) configured for receiving a portion of the inflator therein, as previously described. Airbag system 100 may also include an inflator (not shown) constructed in accordance with the present invention. The inflator is coupled to airbag 110 so as to enable fluid communication with an interior of the airbag.

Vehicle occupant restraint system 200 further contains a known crash event sensor 211 which operably communicates with a known crash sensor algorithm that signals actuation of an airbag system 100 via, for example, activation of the airbag inflator in the event of a collision.

It will be understood that the foregoing description of the preferred embodiment(s) of the present invention is for illustrative purposes only. As such, the various structural and operational features herein disclosed are susceptible to a number of modifications commensurate with the abilities of one of ordinary skill in the art, none of which departs from the scope of the present invention. For instance, in inflator 10, the aperture cross-sectional area may be varied from what is given in the examples. Accordingly, the average aperture diameter may range from 2.0 mm to 6.0 mm but is not thereby limited. Further, the other dimensions of inflator 10 such as the housing diameter and the housing length may be similarly modified. Other modifications will be understood in accordance with the contemplated breadth of the present inventions. The preceding description, therefore, is not meant to limit the scope of the invention. Rather, the scope of the invention is to be determined only by the appended claims and their equivalents.

The invention claimed is:

1. An airbag system comprising:
   an airbag; and
   a plurality of mounting clips coupled to the airbag for mounting the airbag to a vehicle, each mounting clip defining a cavity configured for receiving a portion of an inflator therein,
   wherein the airbag includes a plurality of pairs of opposed tabs extending from edge portions thereof, and wherein a pocket is formed between the tabs of each pair of opposed tabs for receiving a portion of a respective mounting clip of the plurality of mounting clips therein; and
   wherein each clip cavity resides within a portion of the airbag.

2. The airbag system of claim 1 further comprising the inflator received in the mounting clip cavities, the inflator being coupled to the airbag so as to enable fluid communication between the inflator and an interior of the airbag.

3. The airbag system of claim 1 wherein the plurality of pairs of opposed tabs are spaced along the edge portions of the airbag such that the mounting clips are substantially evenly spaced along a length of the inflator when the inflator is received within the mounting clip cavities and the mounting clips are positioned within the pockets.

4. The airbag system of claim 1 wherein the pockets formed between the pain of opposed tabs are in fluid communication with an interior of the airbag.

5. The airbag system of claim 1 wherein a seam between the opposed tabs of at least one pair of the plurality of pairs of opposed tabs is sealed to provide a substantially gas-tight seal.

6. The airbag system of claim 1 wherein each mounting clip of the plurality of mounting clips includes a body portion defining the cavity for receiving the portion of the inflator therein, and a first end portion projecting from the body portion.

7. The airbag system of claim 6 wherein each mounting clip of the plurality of mounting clips further comprises a second end portion projecting from the body portion.

8. The airbag system of claim 7 wherein the second end portion of each mounting clip extends adjacent the first end portion of the at least one clip.

9. The airbag system of claim 8 wherein an interference fit is formed between the inflator and a mounting clip when the second end portion of the clip contacts the first end portion of the clip.

10. The airbag system of claim 6 wherein the body portion is formed from two separate pieces.

11. The airbag system of claim 10 wherein the first end portion extends from a first one of the two separate pieces and a second end portion extends from a second one of the two separate pieces.

12. The airbag system of claim 1 wherein an interference fit is formed between the inflator and at least one clip of the plurality of mounting clips when the portion of the inflator is received in the cavity of the at least one clip.

13. The airbag system of claim 1 wherein an interference fit is formed between the inflator and at least one clip of the plurality of mounting clips when the portion of the inflator is received in the cavity and the at least one clip is mounted to the vehicle.

14. The airbag system of claim 1 wherein at least one clip of the plurality of mounting clips is positioned in an interior of the airbag.

15. The airbag system of claim 1 wherein the inflator comprises:
   a longitudinal enclosure having a substantially uniform cross-sectional area along at least a portion of the enclosure, wherein said longitudinal enclosure comprises a first perforated section and a second perforated section, said first perforated section containing a first gas exit aperture area and said second perforated section containing a second gas exit aperture area, said second gas exit aperture area greater that said first gas exit aperture area;
   a gas generant composition positioned within the at least a portion of the enclosure, the gas generant composition being distributed substantially uniformly along the at least a portion of the enclosure; and an igniter operably fixed to said first perforated section for ignition of said gas generant composition upon inflator activation.

16. A vehicle occupant restraint system comprising:

an airbag; and a plurality of mounting clips coupled to the airbag for mounting the airbag to a vehicle, each mounting clip defining a cavity configured for receiving a portion of an inflator therein, wherein the airbag includes a plurality of pairs of opposed tabs extending from edge portions thereof; and wherein a pocket is formed between the tabs of each pair of opposed tabs for receiving a portion of a respective mounting clip of the plurality of mounting clips therein; and wherein each clip cavity resides within a portion of the airbag.

* * * * *